INVENTOR.
WILLIAM M. OLESON
BY
ATTORNEYS

Jan. 19, 1965 W. M. OLESON 3,166,637

DIGITAL READOUT SYSTEM

Filed April 18, 1962 3 Sheets-Sheet 2

INVENTOR.
WILLIAM M. OLESON

BY

ATTORNEYS

INVENTOR.
WILLIAM M. OLESON
BY
ATTORNEYS 3,166,637
DIGITAL READOUT SYSTEM
William M. Oleson, 2234 Guy St., San Diego, Calif.
Filed Apr. 18, 1962, Ser. No. 188,588
6 Claims. (Cl. 178—26)
(Granted under Title 35, U.S. Code (1952), sec. 266)

The invention described herein may be manufactured and used by or for the Government of the United States of America for governmental purposes without the payment of any royalties thereon or therefor.

This invention pertains to a Teletype readout system, and more particularly, to a Teletype readout system that utilizes electronic elements and components exclusively.

Attempts have been made to employ a Teletype printer to readout Baudot-coded messages sent via burst communication systems such as meteor burst communication systems. As it is necessary to convey as much information or as long a message as possible in a brief period, the duration of the bits in each character may be as short as one microsecond. The one-microsecond bits have to be reformed to a longer length to properly energize a Teletype printer.

An attempt has been made to use a conventional motor-driven, commutator-switching type Teletype receiver distributor as a bit expander preceding a Teletype printer. The apparatus is expensive, heavy and bulky and prone to give erratic operation. The motor and the commutator produce an objectional audible noise and the arcing commutator contacts generate objectionable radio-frequency noise.

It is an object of this invention to provide a Teletype distributor that utilizes electronic elements and components.

It is another object of the present invention to provide a Teletype distributor that generates neither audible or R-F noise.

For better understanding of the present invention, together with other further objects thereof, reference is had to the following description taken in connection with the accompanying drawings, and its scope will be pointed out in the appended claims.

Printing telegraph signals, better known as Teletype signals, are sent in the form of current pulses and current interruptions. The pulse current is designated "mark" and is a closed circuit condition, while the current interruption is designated "space" and is the open-circuit condition. The conditions of mark and space form a character code which is similar to Morse code and is known as the Baudot code. Each character (letter, symbol, or signal) comprises seven bits. The first bit is known as the starting bit and always comprises a space. The last or seventh bit is known as the stopping bit and is always a mark. The first six bits are of equal length and are shorter than the last bit. The second, third, fourth and fifth bits of the character carry the data or information. The end bits are analogous to the spaces preceding and following a Morse code character. The various specific arrangements of the second to sixth bits form the Teletype Baudot code. As there are five bits in this group there is an availability of $2^5$ or 32 permutations.

Figure 1:
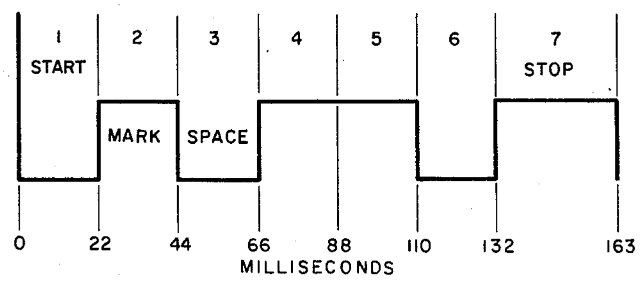
FIG. 1 is a schematic illustration of the Teletype letter "f"

FIG. 1 shows the mark and space relationship for the

Teletype letter "f." As shown in the figure, the first six bits have a duration of 22 milliseconds each. The last bit or the stopping bit has a time duration of 31 milliseconds. When the character duration is 163 milliseconds, as shown, the transmission speed is said to be 60 words per minute. As the transmission speed increases the bit length decreases so that at the speed of 75 w.p.m. the first six bits have a time duration of 18 milliseconds and the stop bit is 25 milliseconds.

Figure 2:
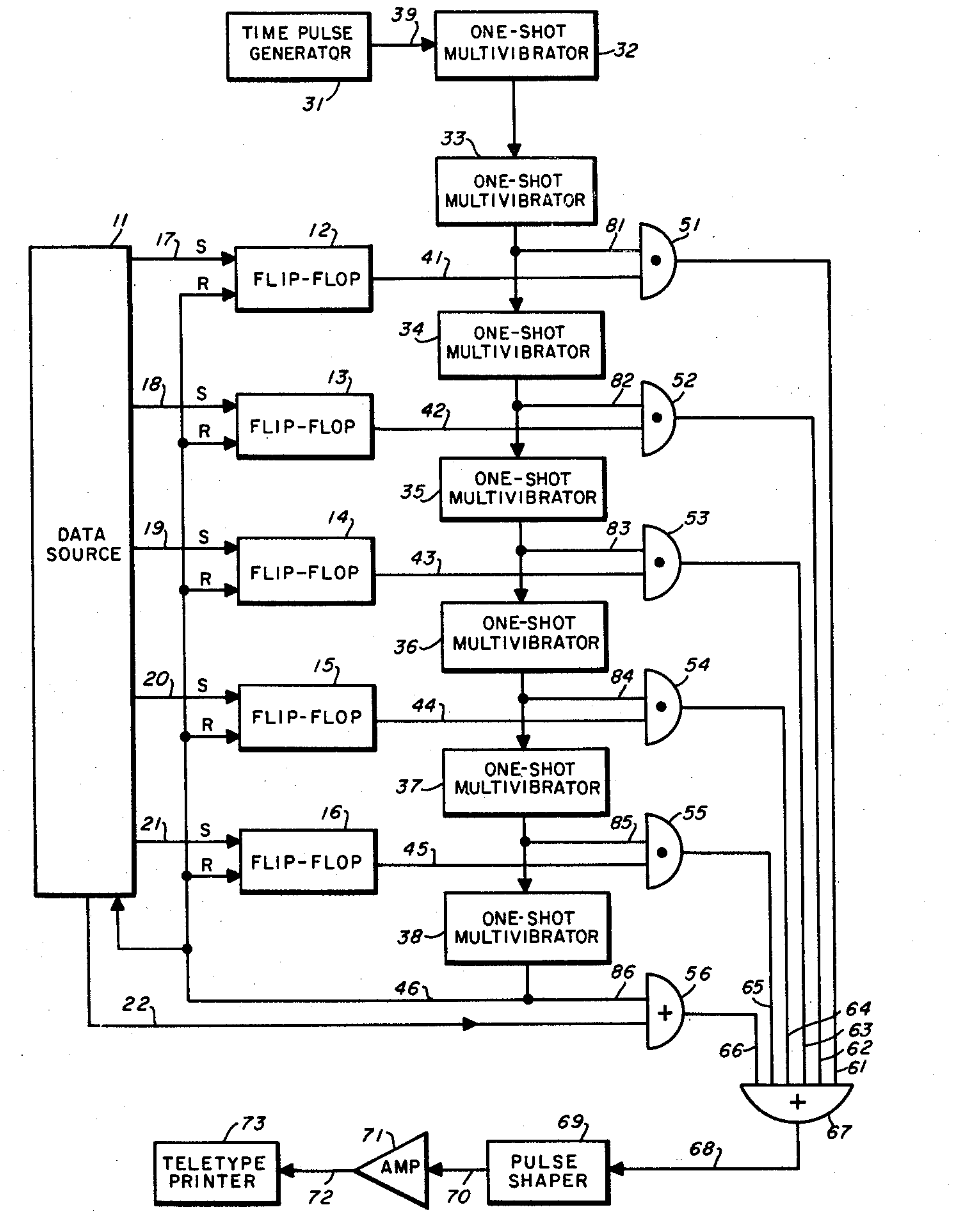
FIG. 2 is a block diagram of readout apparatus in accordance with the invention.

FIG. 2 illustrates an electronic Teletype readout distributor in conformance with applicant's invention. Flip-flop circuits 12–16, conventional bistable multivibrators, each have "set" and "reset" inputs and a single output. The set inputs are designated by the letter "S" and the reset inputs are designated by the letter "R."

Data source 11 has six outputs, lines 17–22, and one input, line 46. Data source 11 is connected to the set inputs of flip-flops 12–16 by means of lines 17–21, respectively. Data source 11 is any source of five-bit groups that are coded in conformance with the Baudot code, for example a conventional memory or storage unit. The five-bits of each group represent or correspond only to the information bits or bits 2–6 of a seven-bit Teletype character. In operation, the data source consecutively emits groups of bits in parallel on lines 17–21. A new group is emitted once every Teletype character period. The bits need not have a duration as long as one Teletype character period, but they must not have a duration in excess of one Teletype period. For example, if the chosen Teletype transmission speed is 60 words per minute, then each Teletype character has a 163-millisecond duration, and the bits emitted from the data source should have a duration of 163 milliseconds or less.

When data signals are absent on data source outputs 17–21, a continuous 1 level signal is produced on data source output 22.

One-shot multivibrators 32–38 each have an input and an output and they are connected in series. Each one-shot multivibrator generates a 1 pulse output of predetermined length when switched or triggered by a 1 pulse. The 1 pulse periods of one-shot multivibrators 32–37 are identical and are the same as the periods of the first six bits of a Teletype character, respectively. The end one-shot multivibrator in the series chain, multivibrator 38, has a period which is identical to the period of the stop bit of a seven-bit Teletype character. Time pulse generator 31 has an output 39 which is connected to the input of one-shot multivibrator 32. Pulse generator 31 may be, for example, a constant-running multivibrator. It has a pulse emission cycle corresponding to the transmission speed with which Teletype characters are to be printed. For example, if the desired Teletype printing speed is 60 w.p.m. then time pulse generator 31 should have a 163-millisecond period because that is the period of a Teletype character when printed at 60 w.p.m. AND gates 51–55 each have two inputs. AND gates 51–55 are coupled to the outputs of flip-flops 12–16 by means of connections 41–45, respectively. The other respective inputs of AND gates 51–55 are connected to the outputs of one-shot multivibrators 33–37, respectively. The output of one-shot multivibrator 38 is connected to the reset inputs of flip-flops 12–16 by means of connection 46. The output of one-shot multivibrator 38 is also connected to one input of two-input OR gate 56 by means of connection 86. The other input of OR gate 56 is connected to data source output connection 22. When data source 11 has no further information to emit on parallel outputs 17–21 a steady 1 level signal is produced on output 22.

Six-input OR gate 67 is coupled to the outputs of AND gates 51–55 and OR gates 56 by means of connections 61–66, respectively. Pulse shaper 69 is connected between amplifier 71 and OR gate 67 by means of connections 68 and 70. The output of amplifier 71 is connected to Teletype printer 73 by means of connection 72.

Figure 3:
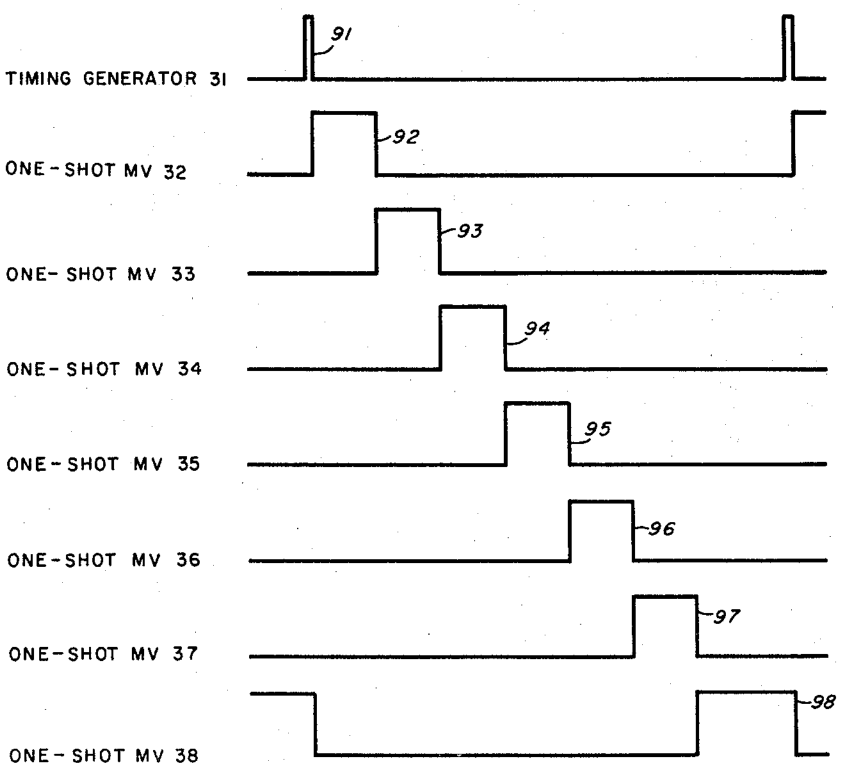
FIG. 3 shows schematically typical waveforms produced by apparatus in accordance with the invention.

In operation, time pulse generator 31 of FIG. 2 runs continuously and emits pulses 91 (FIG. 3) once every Teletype character period, that is, the period of the time pulse generator is the same as the period of one Teletype character. The trailing edge of pulse 91 from pulse generator 31 switches one-shot multivibrator 32 and causes it to produce a pulse 92. The output of one-shot multivibrator 32 is binary as is the output of all the other components in FIG. 2, excluding Teletype printer 73. Assuming then that pulse 92 is a 1 pulse, the duration of pulse 92 is exactly the same as the first bit, the start bit of a Teletype character. The trailing edge of 1 pulse 92 triggers one-shot multivibrator 33 causing it to switch states and produce 1 pulse 93. The duration of this 1 pulse corresponds to the duration of the second bit of a Teletype character. The trailing edge of 1 pulse 93 causes one-shot multivibrator 34 to switch states and produce 1 pulse 94. The duration of pulse 94 corresponds to the duration of the third bit of a Teletype character. The trailing edge of pulse 94 causes one-shot multivibrator 35 to switch and generate 1 pulse 95. The trailing edge of pulse 95 causes one-shot multivibrator 36 to switch states and produce 1 pulse 96. The trailing edge of pulse 96 causes one-shot multivibrator 37 to switch states and produce 1 pulse 97. The duration of pulses 95, 96 and 97 correspond to the duration of bits 4, 5 and 6, respectively, of a Teletype character. The trailing edge of pulse 97 causes one-shot multivibrator 38 to switch states and produce 1 pulse 98. One pulse 98 has a duration corresponding to the duration of the stop bit of a Teletype character. Before one-shot multivibrator 38 switches back to its other state and generates a 0 pulse, pulse generator 31 again produces another pulse 91. Thus, pulse generator 31 starts the entire multivibrator switching cycle over again.

Pulses 98 from one-shot multivibrator 38 are fed to data source 11 to synchronize and trigger the release of five-bit data groups on parallel outputs 17–21. Other signals produced by the apparatus could be used for the same purpose, for example, the output signal from generator 31 could be employed to synchronize and trigger the data source. A group of bits emitted from data source 11 enters flip-flops 12–16 at the set inputs. Assuming for purposes of explanation that marks and 1 pulses or signals are synonymous and that spaces and 0 pulses are likewise synonymous, each flip-flop will produce a 1 output pulse if a 1 pulse (mark) is imposed on its set input. For example, if data source 11 emits a 1 pulse (a mark) on output 17, flip-flop 12 will toggle and produce a 1 pulse on flip-flop output 41. If, however, a space or a 0 pulse is emitted on output 17 then flip-flop 12 will not change states and the signal on line 41 will remain at the 0 level. Once a 1 pulse on line 17 causes flip-flop 12 to switch states, a 1 pulse will be continuously produced on output line 41 until a 1 pulse appears on the reset input of flip-flop 12. When one-shot multivibrator 33 switches states and produces a 1 pulse 93, the output of flip-flop 12 will be either a 1 or 0 depending on the nature of the signal emitted on line 17. The output signals of one-shot multivibrator 33 and the output signals of flip-flop 12 fed into the inputs of AND gate 51, thus, when one-shot multivibrator 33 switches and produces 1 pulse 93, a 1 pulse will be produced in the output of AND gate 51 only if flip-flop 12 is producing a 1 pulse on output line 41. Of course, a 1 pulse will be on line 41 if a 1 pulse entered the set input of the flip-flop. AND gates 52–53 function in a manner identical to that of AND gate 51. As a result of the staggered firing of the one-shot multivibrators, it is impossible for two 1 pulses to appear on any of the inputs of OR gates 67 simultaneously. The duration of pulse 92 which is produced by one-shot multivibrator 32 is identical to the duration of the start bit of a Teletype character. As the start bit is always a space, it is unnecessary to call up this output pulse and pass it through OR gate 67. As the output of one-shot multivibrator is not connected to OR gate 67, when one-shot multivibrator 32 switches state and produces a 1 pulse, the output of OR gate 67 remains at the 0 level (space condition).

When one-shot multivibrator 38 is triggered, a 1 pulse is generated on connection 86. This 1 pulse "passes" through OR gates 56 and 67 enabling a 1 pulse to reach pulse shaper 69. One pulses entering shaper 69 are shaped and then amplified by amplifier 71. The amplified pulses then energizes Teletype printer 73.

Some Teletype printers "run open" (operate erratically using up recording media) in the absence of an incoming message signal unless a continuous mark signal is present on the input of the printer. To keep Teletype printer 73 from running open when data source outputs 17–21 are empty, a continuous 1 level signal (mark) is generated an output 22 when data is no longer emitted on outputs 17–21. A 1 pulse on line 22 will immediately reach printer 73 as a 1 pulse or mark via OR gates 56 and 67, pulse shaper 69 and amplifier 71. This will keep printer 73 from running open regardless of the nature of the input signals on the other inputs OR gates 56 and 67.

Assume for purposes of explanation that the following bits are emitted from output lines 17–21, respectively, after a pulse 98 from multivibrator 38 reaches data source 11: 1–0–1–1–0. As these bits enter flip-flops 12 to 16, flip-flops 12, 14 and 15 will switch states producing 1 pulses on their output lines. The other two flip-flops namely 13 and 16 will remain in their present state and continue to produce 0 pulses on their output lines. When one-shot multivibrator 32 is fired by generator 31 the output of OR gate 67 will remain unaffected and produce a 0 pulse or space because the output of one-shot multivibrator 32 is not connected in any way to OR gate 67. When multivibrator 33 toggles and produces a 1 pulse, a 1 pulse will appear at the output of AND gate 51 as there are 1 pulses present on both inputs of AND gate 51. The 1 pulse on line 61 will cause a 1 pulse to be produced on output connection 68 of OR gate 67 and at the input of printer 73.

Similarly, when one-shot multivibrators 35 and 36 are fired, 1 pulses will be produced at the outputs of AND gates 53 and 54, respectively, as all the inputs of each AND gate will have 1 pulses thereon.

However, no 1 pulses will be produced at the outputs of AND gates 52 and 55 when multivibrators 34 and 37 are triggered, respectively, as 1 pulses will not be present on all the inputs of these AND gates when the multivibrators fire. Specifically, the 0 pulses on lines 42 and 44 will prevent 1 pulses from appearing on the outputs of AND gates 52 and 54.

When one-shot multivibrator 38 is finally fired a 1 pulse will be produced at the output of OR gate 56, at the output of OR gate 67 and so forth.

As each one-shot multivibrator fires in turn, a bit will be produced at the output of OR gate 67 and the input of printer 73. In the instant case, as multivibrators 32–38 fire in turn, a seven-bit serial character having the following configuration will be produced at printer 73: 0–1–0–1–1–0–1 (space-mark-space-mark-mark-space-mark). As this configuration represents the letter "*f*" in the Baudot code (see FIG. 2) the printer 73 will type the letter "*f*."

The frequency of time pulse generator 31 and the duration of the 1 pulses produced by the one-shot multivibrator must be compatible with the Teletype transmission speed selected. Thus, if the desired Teletype transmission speed is 60 w.p.m., then pulse generator 31 should have a 163 millisecond period; one-shot multivibrators 32–37 should have a one-shot period lasting 22 milliseconds; and one-shot multivibrator 38 should have a one-shot period of 31 milliseconds' duration.

Figure 4:
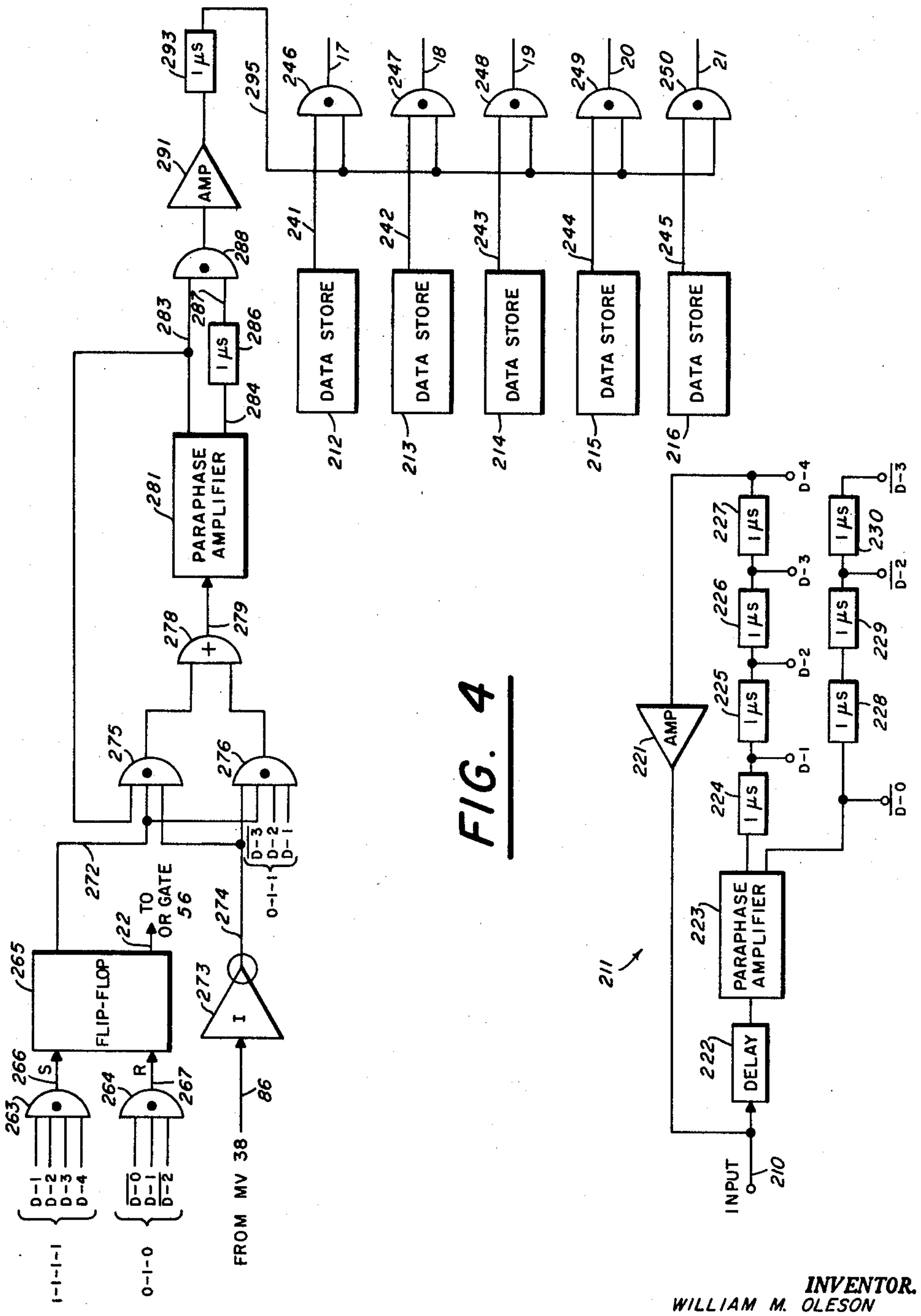
FIG. 4 is a block diagram of a data source applicable in connection with the apparatus of FIG. 2.

FIG. 4 illustrates an exemplary data source applicable in connection with the apparatus of FIG. 1. Stores 212–216 are circulating stores of the variety employing magnetostrictive delay lines. Stores 212–216 store one-microsecond bits corresponding to bits two-six of a Teletype character, respectively. Thus, for example, when an "*f*" Teletype character is loaded into the circulating stores a 1 bit is loaded into store 212, a 0 bit is loaded into store 213, 1 bits are loaded into stores 214 and 215, respectively and a 0 bit is loaded into store 216. Whenever a Teletype character is loaded into the data stores, a 1 bit is simultaneously loaded into a circulating index store 211. Store 211 is similar to the data stores with the exception that the delay line in this store is broken down into sub units. That is, where data stores 212–216 employ a single lumped delay line, index store 211 comprises a large delay 222 and seven, one-microsecond delays 224–230. The total delay in the index store is still the same as the delay in data stores. Paraphase amplifier 223 is interposed between the large delay and the smaller delays. Paraphase amplifier 223 has two outputs one of which is the inversion of the other. Thus, when a 1 pulse is seen on output D–2 a 0 pulse is simultaneously seen on $\overline{\text{D–2}}$. Index store 211 is used for timing and monitoring purposes. An index store and data stores of this type are shown in greater detail in applicant's copending application Serial No. 125,018, filed July 18, 1961.

The outputs of the circulating stores 212–216 are coupled to inputs of AND gates 246–250 by means of connections 241–245, respectively. The outputs of AND gates 246–250 are connections 17–21, respectively. See FIG. 2.

Ignoring the stores, the remaining circuitry in FIG. 4 controls AND gates 246–250 and controls printer 73 when data signals are absent on printer input line 72.

The inputs of AND gates 263 and 264 are connected to outputs of specific one-microsecond delay lines of store 211. These AND gates are used to monitor the quantity of index bits contained in the index store.

The output of AND gate 263 is connected to the set input of a static flip-flop 265 by means of line 266. The output of AND gate 264 is connected to the reset input of the flip-flop by means of connection 267.

One output of flip-flop 265 is connected to OR gate 56 by means of line 22. Line 272 connects the other output of the flip-flop to one input of a three-input AND gate 275. In operation, when the set line of flip-flop 265 bears a 1 pulse, line 272 also bears a 1 pulse. When the reset line carries a 1 pulse the flip-flop switches states and the output signal on line 272 becomes a 0 pulse.

An inverter 273 is connected to the output of multivibrator 38 by means of connection 86. The output signals from the inverter are fed to AND gate 275 and an AND gate 276 via line 274. The remaining inputs of AND gate 276 are connected to specific delay lines in index store 211. The two inputs of OR gate 278 are connected to the outputs of AND gates 275 and 276, respectively.

A paraphase amplifier having an input line 279 and output lines 283 and 284 is fed from the output of OR gate 278. In operation, the signals on output line 283 are in phase with the signals on input line 279 and the signals on line 284 are 180 degrees out of phase with the signals on the input line. The "in-phase" output line of amplifier 281 is connected to an input of AND gate 275 as well as to an input of AND gate 288. Signals on line 284 are delayed one microsecond in delay line 286 before reaching the other input of AND gate 288 via line 287. Signals emitted from AND gate 288 are amplified in amplifier 291 and delayed one microsecond in delay line 293 before they appear on line 295. One pulses on line 295 serve as enabling pulses for AND gates 246–250, and permit data to pass from the stores to flip-flops 12–16.

In operation, the output line 274 of inverter 273 carries a 0 pulse when pulses 98 are generated by multivibrator 38. During the remaining periods the line remains at the 1 level. Every time the head of the pulse train in the index store reaches the output of delay line 225 1 pulses appear at $\overline{\text{D–3}}$, D–2 and D–1 (assuming there are at least two one-microsecond pulses in the store). The outputs of delay lines 224, 225 and 230 (D–1, D–2 and $\overline{\text{D–3}}$) are fed to respective inputs of AND gate 276. If there is a 1 pulse on line 272 when 1 pulses appear respectively on line 274 and the D–1, D–2 and $\overline{\text{D–3}}$ inputs of AND 276, a 1 pulse will be produced at the output of AND gate 276, at the output of OR gate 278 and on line 283.

The output signals on line 283 are fed back to the input of AND gate 275. Thus, the output of AND gate 275, OR gate 278 and the "in-phase" output of amplifier 283 will remain at the 1 level as long as lines 272 and 274 both carry 1 level signals. In short, the feedback loop enables line 283 to remain at the 1 level longer than the duration of the 1 pulses appearing on the D–1, D–2 and $\overline{\text{D–3}}$ inputs of AND gate 276.

The paraphase amplifier 281, delay line 286 and AND gate 288 function to limit the number of 1 pulses reaching amplifier 291. A 1 pulse can be produced at the input of amplifier 291 only when 1 pulses appear simultaneously on both AND gate inputs.

When there is a 0 pulse on line 279 there is a 0 pulse on line 283 and a 1 pulse on line 287. When a 1 pulse then appears on line 279, a 1 pulse immediately appears on line 283, but a 1 pulse does not appear on line 287 until one microsecond has elapsed due to delay line 286. During the one microsecond when both inputs of AND gate 288 carry 1 pulses, a 1 pulse one-microsecond in duration is produced at the output of the gate. Once the one-microsecond period has elapsed there is a 1 pulse on line 283, a 0 pulse on line 287 and a 0 pulse at the input of amplifier 291 (assuming of course that the amplifier input signal remains a 1 after the one-microsecond period).

One pulses emitted from AND gate 288 are amplified in amplifier 291 and delayed one-microsecond in delay line 293 before reaching AND gates 246–250. As the 1 pulses are necessarily one-microsecond long, each 1 pulse enables one bit to pass from each store to its respective flip-flop.

AND gates 263 and 264 and flip-flop 265 function to provide a "hold" voltage for printer 73 as well as control the operation of AND gates 275 and 276.

As was pointed out above, certain Teletype printers require a "mark" condition in the absence of a Teletype message signal to prevent erratic operation of the printer. Flip-flop 265 causes a 1 signal ("mark" condition) to be impressed on the printer when the stores are empty so the printer won't run "open."

Index store 211 always carries one more bit than the data stores so that the timing sequence will not be disrupted when the data stores become empty. Thus, when there is only one bit remaining in the index store and this bit leaves delay line 224, 1 pulses appear at D–1, $\overline{\text{D–0}}$ and $\overline{\text{D–2}}$ simultaneously.

When the data stores are empty and there is just one index bit left in the index store, 1 pulses (one-microsecond in duration) eventually appear simultaneously on the three inputs of AND gate 264, a 1 pulse appears on set input 266 and flip-flop 265 toggles. When the flip-flop toggles, line 22 bears a 1 pulse and line 272 bears a 0 pulse. The 1 pulse passes through OR gate 56, OR gate 67, shaper 69, amplifier 71 and "holds" printer 73.

When four bits are circulating in the index store 1 pulses are produced simultaneously at D–1, D–2, D–3 and D-4 every time the bits pass through delay lines 224–227. When there are at least four bits in the index store, 1 pulses are eventually produced simultaneously at the four inputs of AND gate 263 for one-microsecond and a one-microsecond 1 pulse is produced on line 266, the set line of flip-flop 265. The 1 pulse on the set input of the flip-flop causes the flip-flop to switch states and a 1 pulse is produced on line 272 and a 0 pulse is produced on line 22. The 1 pulse on line 272 enables AND gates 275 and 276 as was pointed out above. The 0 pulse on line 22 which is connected to an input of OR gate 56 allows the readout process to progress without interruption. That is, the 0 pulse on line 22 in no way or manner interferes with the passage of 1 pulses "through" OR 56 or 1 pulses "through" OR 67.

Obviously many modifications and variations of the present invention are possible in the light of the above teachings. It is therefore to be understood that within the scope of the appended claims the invention may be practiced otherwise than as specilcally described.

What is claimed is:

1. A Teletype distributor for converting ($n$—2)-bit characters, which are emitted in parallel from a storage with $n$—2 outputs, to serially arranged $n$-bit Teletype characters, comprising $n$—2 flip-flops each having set and reset inputs and an output, means for coupling said storage outputs to said set inputs, respectively, ($n$—2) AND logic circuits each having first and second inputs and an output, said outputs of said flip-flops being coupled to said first inputs of said AND logic circuits, respectively, $n$ pulse generators each having a trigger input and an output, means having an output for generating timing pulses, said generating means output being coupled to said input of said first pulse generator, said outputs of said first through $n$—1 generators being coupled to said inputs of said second through $n$th generators, respectively, said outputs of said second through $n$—1 generators also being coupled to said second inputs of said AND logic circuits, respectively, an OR logic circuit having $n$—1 inputs and one output, means for coupling said output of said $n$th pulse generator to said reset inputs of all of said flip-flops and to one input of said OR logic circuit, means for coupling said outputs of said AND logic circuits to said remaining inputs of said OR logic circuit, respectively, said OR logic circuit adapted to serially emit said $n$-bit Teletype characters.

2. Apparatus in accordance with claim 1 wherein said pulse generators are one-shot multivibrators, and the one-shot periods of the first through $n$th multivibrators correspond to the bit durations of the first through $n$th bits of said Teletype characters.

3. Apparatus in accordance with claim 1 wherein the period of said means for generating timing pulses is the period of one Teletype character.

4. Apparatus in accordance with claim 1 which additionally includes a Teletype printer having an input, means for coupling said output of said OR logic circuit to said input of said printer, and control means coupled to said printer for maintaining a mark condition on said printer input in the absence of said serial $n$-bit Teletype character.

5. Apparatus in accordance with claim 1 wherein said parallel-emitted pulses have a duration less than one Teletype character period.

6. A Teletype distributor for converting five-bit characters, which are emitted in parallel from a five-output memory, to serially arranged seven-bit Teletype characters, comprising five flip-flops each having set and reset inputs and an output, means for coupling said memory outputs to said set inputs, respectively, five AND gates each having first and second inputs and an output, said outputs of said flip-flops being coupled to said first inputs of said AND gates, respectively, first, second, third, fourth, fifth, sixth and seventh pulse generators each having a trigger input and an output, means having an output for generating synchronizing pulses, said generating means output being coupled to said input of said first pulse generator, said outputs of said first, second, third, fourth, fifth and sixth pulse generators being coupled to said inputs of said second, third, fourth, fifth, sixth and seventh generators, respectively, said outputs of said second, third, fourth, fifth and sixth pulse generators also being coupled to said second inputs of said AND gates, respectively, a six-input OR gate having an output, means for coupling said output of said seventh pulse generator to said reset inputs of all of said flip-flops and to one input of said OR logic circuit, means for coupling said outputs of said AND logic circuits to said remaining inputs of said OR logic circuit, respectively, said OR gate adapted to serially emit said seven-bit Teletype characters.

References Cited by the Examiner

UNITED STATES PATENTS

| | | | |
|---|---|---|---|
| 2,767,908 | 10/56 | Thomas | 235—92 |
| 2,920,820 | 1/60 | Cox et al. | 340—347 |
| 3,040,984 | 6/62 | Goldberg et al. | 235—92 |
| 3,063,632 | 11/62 | Stringer et al. | 235—92 |

ROBERT H. ROSE, *Primary Examiner.*

MALCOLM A. MORRISON, *Examiner.*